W. W. CHRISTMAS.
MATERIAL FOR USE IN AIRCRAFT CONSTRUCTION.
APPLICATION FILED DEC. 13, 1918.
1,412,510.
Patented Apr. 11, 1922.
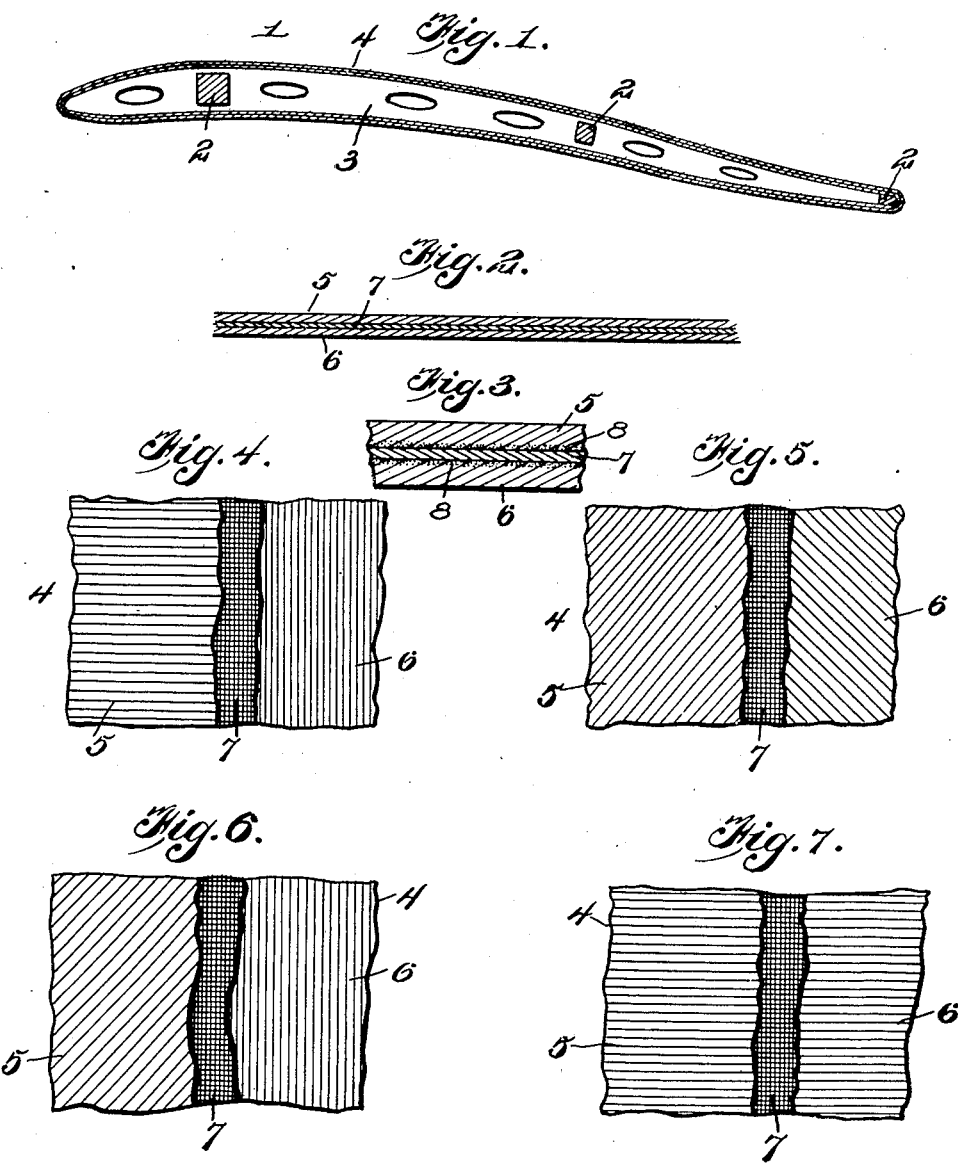

UNITED STATES PATENT OFFICE.

WILLIAM WHITNEY CHRISTMAS, OF NEW YORK, N. Y.

MATERIAL FOR USE IN AIRCRAFT CONSTRUCTION.

1,412,510.      Specification of Letters Patent.      Patented Apr. 11, 1922.

Application filed December 13, 1918. Serial No. 266,637.

*To all whom it may concern:*

Be it known that I, WILLIAM W. CHRISTMAS, a citizen of the United States, residing at New York, in the county of New York and State of New York, have invented new and useful Improvements in Materials for Use in Aircraft Construction, of which the following is a specification.

This invention relates to improvements in air craft and other analogous constructions, and particularly to a novel and improved construction of laminated sheet material for use in the formation of shell or other bodies and the like and as a surfacing for framed or other bodies, wings, ailerons, tail and other planes, and other similar parts of airplanes and other aircraft for other similar purposes.

The particular object of my invention is to provide a laminated sheet material composed of layers of laminæ of thin wood veneer and a woven textile or other fabric, combined and cemented together, preferably by the use of an elastic cement, in such a manner that the fibers of the veneer and fabric are more or less felted, homogeneously bound or intermingled, so that the laminæ will have a greater degree of strength, tenacity and uniformity of connection throughout than is possible to be secured by ordinary surface adhesion, whereby a composite sheet material is produced which may be as light as the ordinary airplane fabric, but is of materially greater strength and durability, which is also much less inflammable and possesses other desirable advantages over the surfacing fabric commonly employed, and which is furthermore universally flexible upon itself and therefore capable of being bent, curved, molded, pressed, coiled, twisted, or otherwise shaped to any given form, thereby rendering it of great value as a material in the construction of shell or other bodies, wings and other parts of aircraft requiring exact refinements of form or curvature, combined with strength, durability, resistance to distortion and breaking or tearing strains, and a desirable degree of non-inflammability.

A further object of the invention is to provide airplane or other structural elements embodying my improved sheet material as a component part thereof, whereby a superior type of structural element is produced.

The invention consists of the features of construction, combination and arrangement of parts hereinafter fully described and claimed, reference being had to the accompanying drawing, in which:—

Figure 1 is a fore-and-aft section of an airplane wing showing the application of the material as a surface covering.

Figure 2 is a section through a portion of the sheet material on an enlarged scale.

Figure 3 is a similar view of a portion of the sheet on a magnified scale, disclosing particularly the binding connection between the laminæ.

Figures 4, 5, 6 and 7 are fragmentary plan views of the sheet material, with parts broken away to show the lamina, illustrating some of the many relative arrangements of the veneer layers which may be employed to modify the sheet to suit different conditions of service.

Referring particularly to Figure 1 of the drawing, wherein, for purpose of exemplification, I have shown the application of the invention as a surface covering for an airplane wing or other similar purposes, 1 generally designates the wing, which, as usual, is made up of a framework consisting of suitable spars or longitudinal frame members 2 and ribs or transverse frame members 3, said framework being enclosed by a surface covering ordinarily consisting of suitably doped fabric. The surface covering 4 shown is composed of a laminated sheet constructed in accordance with my invention which is employed in place of the usual fabric.

The sheet 4, in its simplest form disclosed, consists of opposed layers 5 and 6 of thin sheet wood or other veneer, preferably, but not necessarily, spruce, and an intermediate layer 7 of a woven textile fabric, such as cotton, linen, or the like. The opposed faces of these layers lie directly in contact with each other and are united by glue or cement 8, preferably an elastic glue or cement which is not liable to crack or crumble under vibratory strains, and which, in addition, will preserve its integrity when the sheet is bent, rolled or otherwise varied from a flat form to assume a desired shape or curvature. The glue or cement employed may also be of a weather or waterproof character, or both, when required.

In the process of making the sheet the surfaces of the layers 5, 6 and 7 which are to be united are coated with the glue or cement in any suitable manner and said layers then laid in superposed relation with the coated surfaces in contact. Pressure of a suitable sort is then applied to the assembled layers to compress or compact the sheet and hold the coated surfaces in intimate contact until the glue or cement is dry or has set or assumed the proper condition to bind the layers firmly and permanently together. The sheet so prepared, whether in flat or other primarily-imparted form, is then ready for use and for such subsequent surface finishing as may be found desirable or necessary.

An essential, important and highly valuable feature of the laminated sheet so prepared in accordance with my invention is that it is readily and freely pliable without fracture. This is due to the fact that the fabric or other binder not only generally reinforces the veneer sheets, but binds and holds the fibres intact. Hence the fibres tend to mutually strengthen and reinforce each other to such an extent that the sheet is rendered universally flexible upon itself and may be bent, folded, curved, coiled, rolled, or twisted without liability of fracture of the sheet or separation of its component parts from each other. It will, of course, be evident that these highly desirable properties of the prepared sheet are the result of the components of two resistant forces, in addition to others hereinafter described, firstly, the general reinforcing action given by the fabric layer, and, secondly, the fact that the abutting faces of the layers are parallel and in continuous surface contact throughout the area of the sheet, whereby the fibres throughout are combined to mutually resist all stresses and strains tending to distort their integrity and cause fracture or displacement.

The sheet may be made initially in flat form and of any suitable size, in which event it may be cut up into sizes desired for use and employed in flat form or bent or shaped into any form required. Also in order to compact, as well as, if desired, to give any required shape to the sheet, it may first be passed between compressing rolls and then suitably held under pressure until the glue or cement has dried or set, or the sheet may be compressed in molds or forms, as between opposed dies or like compressing surfaces, which may be of a character to give any desired regular or irregular curve or other intended configuration to the sheet. The compression of the sheet may be to such a degree as to cause the fibres upon the abutting faces of the veneer sheets to be entangled or felted with the fibres of the fabric, as shown in Figure 3, or the abutting faces of the sheets may be abraded or otherwise suitably prepared for this purpose, such fibres being thereby bound in a matted condition by the glue or cement. A substantially homogeneous connection between the layers is thus effected, whereby universal flexion of the sheet is permitted without liability of fracture of the veneer or disconnection of the lamina. Thin veneer may accordingly be used in a staisfactory manner, since it will be reinforced against its tendency to puncture readily, fracture across the grain or split longitudinally of the grain. While the use of spruce or other long-grained wood veneer is found advantageous to promote a binding action, the construction described also lends itself to the use of medium-long-grained woods in an effective manner.

In practice, in order to secure still greater strength and durability, the layers 5 and 6 are or may be arranged so that the grain of one runs at an angle to the gran of the other. In some cases the grains of the layers may run at right angles to each other, as shown in Figure 4, or they may run at reverse diagonal angles, as shown in Figure 5, or the grain of one layer may run diagonally and the grain of the other layer run straight, longitudinally or transversely, as shown in Figure 6, or, when desired, the grains of the layers may be straight and parallel, as shown in Figure 7. I do not, of course, limit myself in this connection to any particular relative arrangement of the grains of the veneer, although it is to be understood that, whenever practicable, the grains will be arranged to run at an angle for the sake of increased strength.

In the example of the application of the invention as a covering for an aeroplane or other parts as shown in Figure 1, the covering 4 is illustrated as being in a continuous sheet doubled upon itself to form the reaction and rarefaction surface layers, the bight of the doubled sheet forming a fold at the leading edge of the wing and the edges of the sheet being suitably secured at or near the trailing edge of the wing. This construction provides a continuous double surfacing which may be quickly and conveniently applied to the frame structure and, through its pliability, will assume any given shape of wing form or curvature. The sheet may be tacked, glued or otherwise fastened in position and doped or otherwise surface-finished to render it weather or waterproof or both and of as smooth a finish as desired.

While the sheet material is pliable enough to be shaped in many ways, it is adapted, when secured to a frame structure or suitably braced, to provide a surface which is exceedingly strong and highly resistant to strains. It, therefore, may be used to great advantage in the construction of shell or other bodies and as a surface covering for the frames of other parts of aircraft, as it is of much greater strength than any ordinary fabric, may be bent or curved to assume any streamline shape and will retain such shape indefinitely. Furthermore, it may be made of a weight not greater than ordinary surfacing fabric and is non-imflammable to a much higher degree.

It is, of course, to be understood that the number of layers in the sheet material may be multiplied indefinitely, according to the thickness of the sheet to be produced.

Having thus fully described my invention, I claim:—

1. The herein-described material for use in aircraft construction comprising a comparatively thin laminated sheet composed of thin flexible layers of wood veneer and an interposed binder of a textile fabric, said veneer and fabric layers having continuously plane contacting surfaces cemented together with the fibres of said surfaces intermingled to substantially homogeneously bind said layers together, whereby the wood fibers are intermatted with and reinforced by the fabric fibers throughout the area of the sheet, said sheet being universally flexible upon itself and capable of being bent, molded or otherwise shaped into a desired form.

2. The herein-described material for use in aircraft construction consisting of a laminated sheet composed of oppositely disposed layers of thin wood veneer and an intermediate layer of a linen fabric, said layers of veneer and fabric having their opposed faces cemented one to the other, and the fibres of the abutting faces thereof intermingled to provide a substantially homogeneous sheet.

3. The herein-described material for use in aircraft construction consisting of a laminated sheet composed of oppositely disposed layers of thin wood veneer and an intermediate layer of textile fabric, said layers of veneer and fabric having their opposed faces cemented one to the other, the abutting faces of said veneer being abraided so that the fibres thereof are intermingled with the fibres of the opposed faces of said fabric to provide a substantially homogeneous sheet.

In testimony whereof I affix my signature.

WILLIAM WHITNEY CHRISTMAS.